(12) United States Patent
Rohde et al.

(10) Patent No.: US 6,327,323 B1
(45) Date of Patent: Dec. 4, 2001

(54) MULTIPLE REACTOR CONTAINMENT BUILDING

(75) Inventors: Kenneth R. Rohde, Granby; Justin Lloyd Ford, Ashford, both of CT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/061,786

(22) Filed: Apr. 17, 1998

(51) Int. Cl.[7] ................................................. G21C 13/00
(52) U.S. Cl. ........................ 376/293; 376/277; 376/287; 376/911
(58) Field of Search ..................... 376/277, 287, 376/293, 909, 911, 912, 216, 318, 378

(56) References Cited

U.S. PATENT DOCUMENTS

| | | | |
|---|---|---|---|
| 3,008,889 | * 11/1961 | Junkins | 204/193.2 |
| 3,232,843 | * 2/1966 | Went et al. | 176/37 |
| 3,446,171 | * 5/1969 | Panoff et al. | 376/293 |
| 3,659,541 | * 5/1972 | Rigg | 114/0.5 |
| 3,889,707 | * 6/1975 | Fay et al. | 137/251 |
| 3,941,187 | * 3/1976 | Jabsen et al. | 165/157 |
| 4,091,864 | * 5/1978 | Cocuzza et al. | 165/1 |
| 4,093,514 | * 6/1978 | Iljunin et al. | 176/65 |
| 4,104,117 | 8/1978 | Parziale et al. | 176/20 |
| 4,289,196 | * 9/1981 | Jabsen et al. | 165/83 |
| 4,424,186 | * 1/1984 | Cook | 376/211 |
| 4,568,522 | * 2/1986 | Corbett | 422/186 |
| 4,975,238 | * 12/1990 | Regan et al. | 376/216 |
| 5,013,519 | * 5/1991 | Nakamura et al. | 376/179 |
| 5,112,569 | * 5/1992 | Cinotti | 376/282 |
| 5,247,553 | * 9/1993 | Herring | 376/912 |
| 5,706,320 | * 1/1998 | Boardman et al. | 376/283 |

FOREIGN PATENT DOCUMENTS

| | | | |
|---|---|---|---|
| 2323743 | * 11/1973 | (DE) . | |
| 3228422 | * 2/1984 | (DE) . | |
| 1258046 | * 12/1971 | (GB) . | |
| 51-098495 | * 8/1976 | (JP) . | |
| 63307183 | * 12/1988 | (JP) . | |
| 2-240596 | * 9/1990 | (JP) . | |
| 02240596 | 9/1990 | (JP) | 376/293 |
| 4-127083 | * 4/1992 | (JP) . | |
| 04127083 | 4/1992 | (JP) | 376/293 |
| 06174889 | 6/1994 | (JP) | 376/293 |
| 6-174889 | * 6/1994 | (JP) . | |
| 95-173186 | 7/1995 | (JP) | 376/293 |
| 95-247353 | 9/1995 | (JP) | 376/298 |
| 09068588 | 3/1997 | (JP) | 376/293 |
| 9-068588 | * 3/1997 | (JP) . | |
| 10115692 | 5/1998 | (JP) | 376/293 |
| 10-115692 | * 5/1998 | (JP) . | |
| 10260293 | 9/1998 | (JP) | 376/293 |
| 10-260293 | * 9/1998 | (JP) . | |

OTHER PUBLICATIONS

Written Opinion from International Preliminary Examination Authority, dated Oct. 29, 1999.

International Preliminary Examination Report (IPER) from International Preliminary Examination Authority, dated Mar. 9, 2000.

* cited by examiner

*Primary Examiner*—Charles T. Jordan
*Assistant Examiner*—Jack Keith

(57) ABSTRACT

A nuclear power plant includes at least two reactor vessels enclosed within a single containment building. In a first embodiment, the reactor vessels and steam generators operate separately from one another. In a second embodiment the reactor vessels jointly provide heat to a common header having a plurality of steam generators associated therewith. In a third embodiment, the reactor vessels are completely integrated with one another by means of a single control and coolant system.

4 Claims, 4 Drawing Sheets

MULTIPLE REACTOR CONTAINMENT BUILDING

FIELD OF THE INVENTION

The present invention relates to a plurality of reactor vessels within a single containment building.

BACKGROUND OF THE INVENTION

Nuclear reactors use the thermal energy produced through fission to produce energy. Typically, a coolant such as water flows about nuclear fuel elements contained within a reactor vessel under such a high pressure that it remains in liquid form at a temperature far above the normal boiling point. The coolant goes to a heat exchanger including a feedwater header, where it gives up heat to a secondary stream of water that turns to steam while the primary stream of coolant returns to the reactor vessel. The steam is then used to run a steam generator turbine. Alternatively, the pressure is adjusted so that steam generation occurs as the water passes over the fuel elements. In the latter case, the steam passes directly from the reactor vessel to one or more steam generated turbines and is then condensed by a condenser before returning to the reactor vessel.

Nuclear reactors are designed to operate safely without releasing radioactivity to the outside environment. Nevertheless, it is recognized that accidents can occur. As a result, the use of multiple barriers has been adopted to deal with such accidents. These barriers include the fuel cladding, the reactor coolant or steam supply system, and thick shielding. As a final barrier, the reactor is housed in a large steel containment building.

Containment buildings vary considerably in design from plant to plant. Many are vertical cylindrical structures covered with a hemispherical or shallow domed roof and with a flat foundation slab. Other containment buildings may be spherical in shape.

Containment buildings are often not visible since they are usually surrounded by a steel or concrete outer building that also include many non-essential plant support systems, structures and auxiliary buildings which need not be included within the containment building. Nevertheless, these other systems and auxiliary structures and buildings must be located in close proximity to the reactor containment building.

A containment building houses the entire primary system of a nuclear reactor including the reactor vessel, reactor coolant or recirculation systems, pumps, and steam generators. The containment building includes a number of compartments for the housing of auxiliary equipment, safety systems, and various other systems.

The containment building is designed and tested to prevent any radioactivity that escapes from the reactor from being released to the outside environment. As a consequence, the building must be airtight. In practice, it must be able to maintain its integrity under circumstances of a drastic nature, such as accidents in which most of the contents of the reactor are released to the building. It has to withstand pressure buildups and damage from debris propelled by an explosion within a reactor. It must past tests to show it will not leak even when its internal pressure is well above that of the surrounding air. Typically, a containment building is designed to sustain internal pressures in the range of 45 to 60 psig. However, much higher pressures, even exceeding 100 psig, may be sustained.

The containment building is also designed and tested to protect a reactor against outside forces. Such outside forces include natural or man-made forces such as earthquakes, floods, tornadoes, explosions, fires and even airplane crashes.

One of the major factors influencing containment building design and placement is economic, since a containment building is one of the most expensive structures of a nuclear power plant. Containment buildings are currently usually designed in accordance with site-specific requirements established for each nuclear power plant. Site-specific designs prevent the standardization of the containment building and further increase cost.

As a result of such expenses, it is desirable to maximize the amount of energy generated by such a plant. There is a current limit of approximately 1800 MW of thermal power heat generation from a single reactor. However, core stability is less than ideal at such a reactor unless substantial expensive modifications are made. As a result, in modern practice, a single reactor has been placed in a single containment building having an energy output on the order of approximately 850 to 1450 MW. The greatest core stability occurs at approximately 1100 MW of thermal power generation.

SUMMARY OF THE INVENTION

A nuclear reactor plant includes at least two or more reactor vessels each having an independent ability to generate thermal energy which is transferred away from the reactor vessels by means of coolant contained within a coolant system. The thermal energy is received by at least one steam generator which converts the thermal energy to electricity.

In one preferred embodiment, the reactors operate completely separately from one another. However, the containment building requires significantly less material than if two separate containment buildings were required. For example, if a spherical containment building is used, the revised diameter of the building is only approximately 1.2 to 1.3 times the original diameter. In a second preferred embodiment the reactor vessels are independently controlled and include their own coolant systems. However, they jointly provide heat to a common header having a plurality of steam generators connected to it. The second embodiment represents a partial integrated control philosophy. In a third preferred embodiment, the reactor vessels are completely integrated with one another by means of a single control and coolant or steam supply system.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENTS

Figure 1:
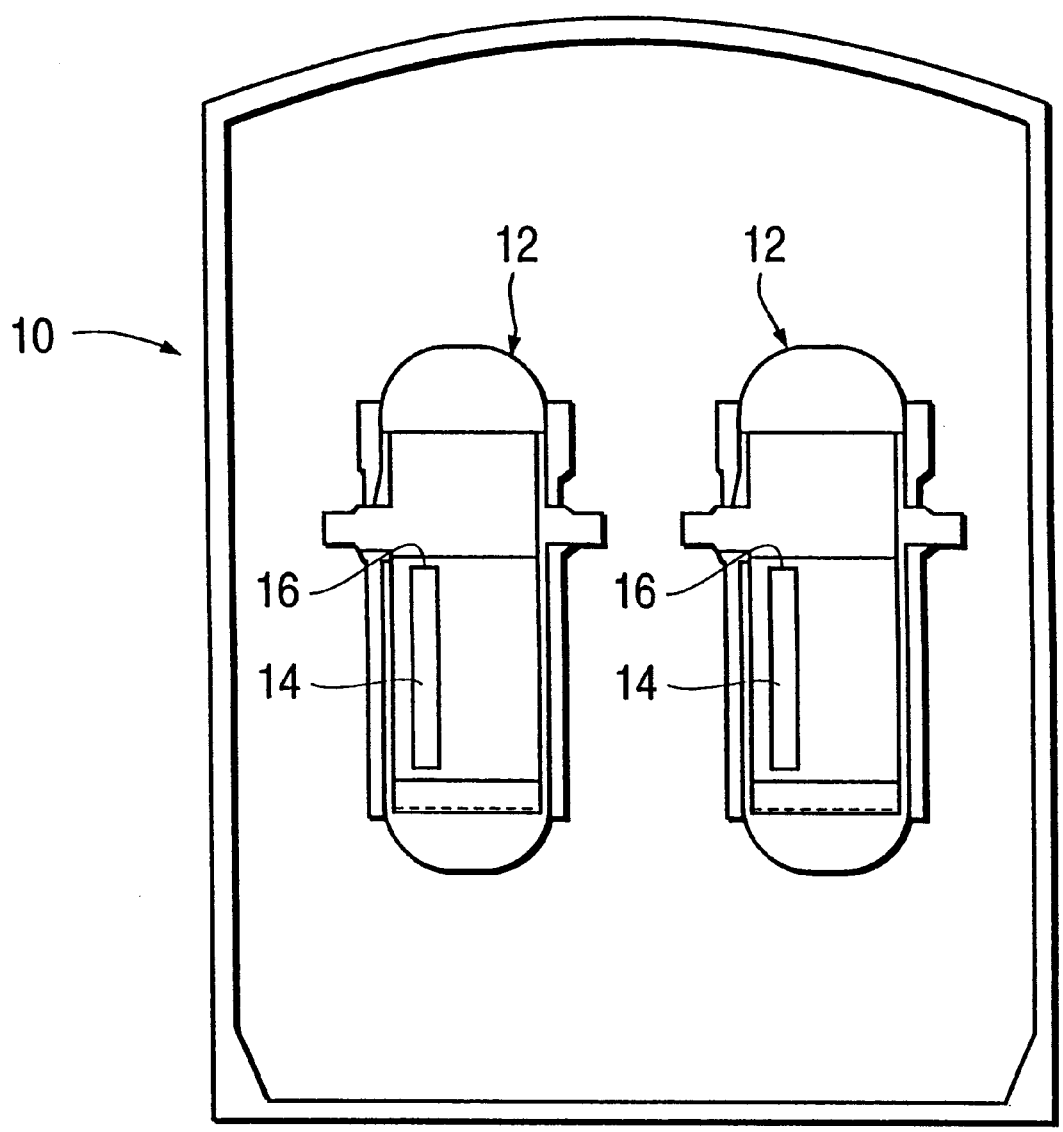
FIG. 1 is a view of a single containment building enclosing more than one reactor vessel.
Figure 2:
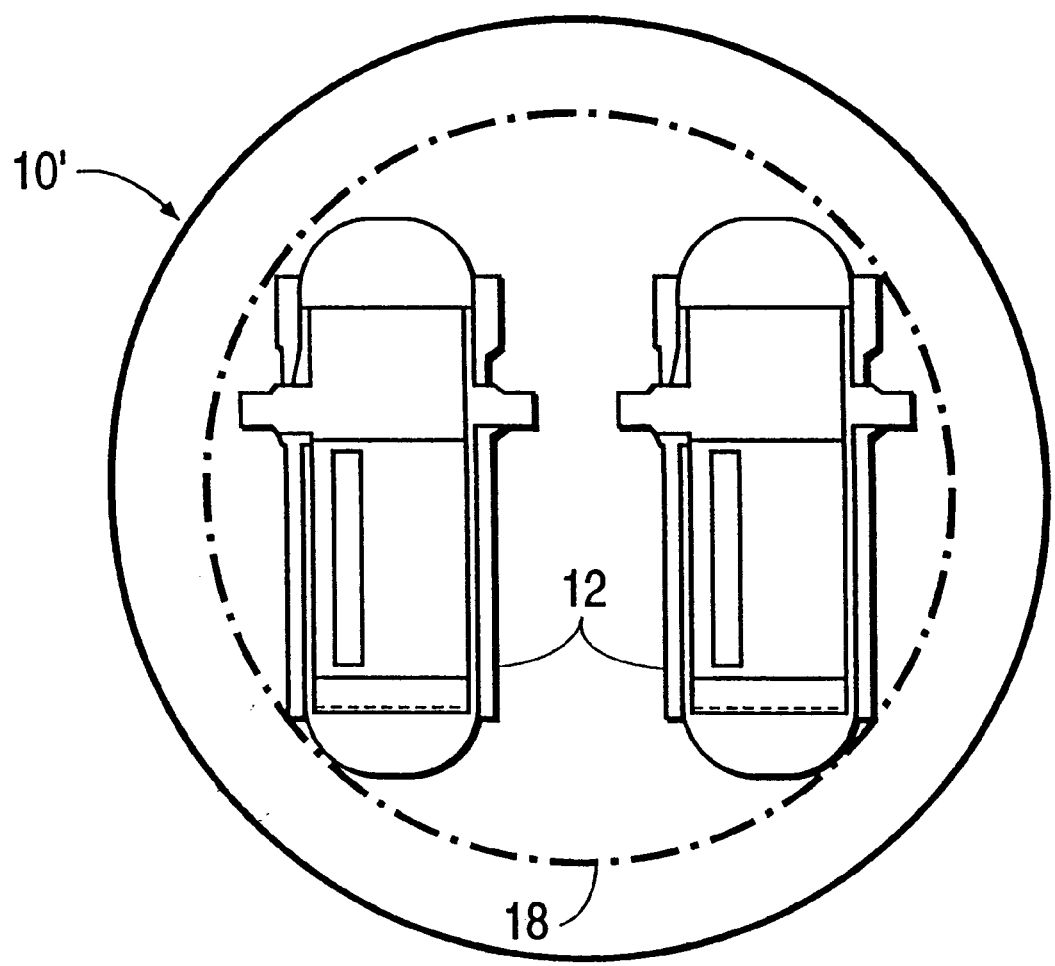
FIG. 2 is a view of a spherical containment building having two reactor vessels with the diameter of a typical reactor building designed to hold only one reactor vessel shown in phantom.

FIG. 1 illustrates a nuclear power plant having a single containment building 10 enclosing more than one reactor vessel 12. Each vessel 12 includes a plurality of fuel bundles 14, the bundles including fuel rods (not shown) encased in a fuel cladding 16. Water flows upwardly past fuel bundles 14, where it is heated, and then flows through an outlet nozzle. Containment building 10 is generally cylindrical with a hemispherical or shallow domed roof. In FIG. 2, a second single containment building 10' is illustrated which is generally spherical.

Containment building 10 houses the entire primary system of a nuclear reactor including reactor vessel 12, the reactor coolant or steam supply system with steam lines and water or other coolant, pumps, heat exchanges and steam generators. The associated control systems for reactor vessels 12 and both the coolant system and steam Generators are also enclosed within containment building 10. The various systems are customized for a particular reactor and require extraordinary levels of redundancy and backup. Therefore, they are extremely costly to implement at each physical plant location.

Containment building 10 is a key barrier associated with nuclear reactor safety. First, containment building 10 must be able to prevent any radioactivity that escapes from a reactor vessel 12 from being released to the outside environment even if its internal pressure is substantially above that of the surrounding ambient air and even if a reactor vessel literally explodes and propels debris toward the walls of the containment building. Second, containment building 10 must protect the rest of the nuclear reactor against outside calamities such as earthquakes, floods, tornadoes, explosions, fires, and even aircraft crashes. Not surprisingly, with such rigid requirements and the associated customization required for each physical location, containment building 10 is one of the most expensive structures of a nuclear power plant.

To help defray cost, the conventional wisdom has been to maximize the power associated with a single reactor vessel 12 such that the total power generated by the plant makes the up-front construction and safety costs more economical. However, current nuclear power plants are reaching a practical limit on the amount of energy which can be generated in view of additional added expense and core stability issues.

The use of two or more conventional reactor vessels 12 within a single containment building 10 provides significant advantages over the prior art use of a single reactor vessel 12. For example, duplication of construction costs required by having completely separate containment buildings are minimized. As illustrated in FIG. 2, the phantom line 18 represents a typical diameter of approximately 200 feet required for a spherical containment building. The total volume of such a spherical containment building is approximately 4.2 million cubic feet. If the diameter is in creased by only approximately 52 additional feet, the total volume is doubled to approximately 8.4 million cubic feet. Thus, the revised diameter of a building adapted to hold two reactor vessels 12 is less than 1.5 times the original building diameter and preferably only between 1.2 and 1.3 times the original diameter.

Further, certain control systems may be shared between each of the reactor vessels 12. Even if the primary systems are maintained completely separate for each of the reactor vessels, certain backup systems and the like may be shared between the vessels, providing a further level of economization. In addition, the use of a multiple number of reactor vessels in various different configurations provides a significantly improved level of control and customization depending on the current needs of the plant.

Figure 3:
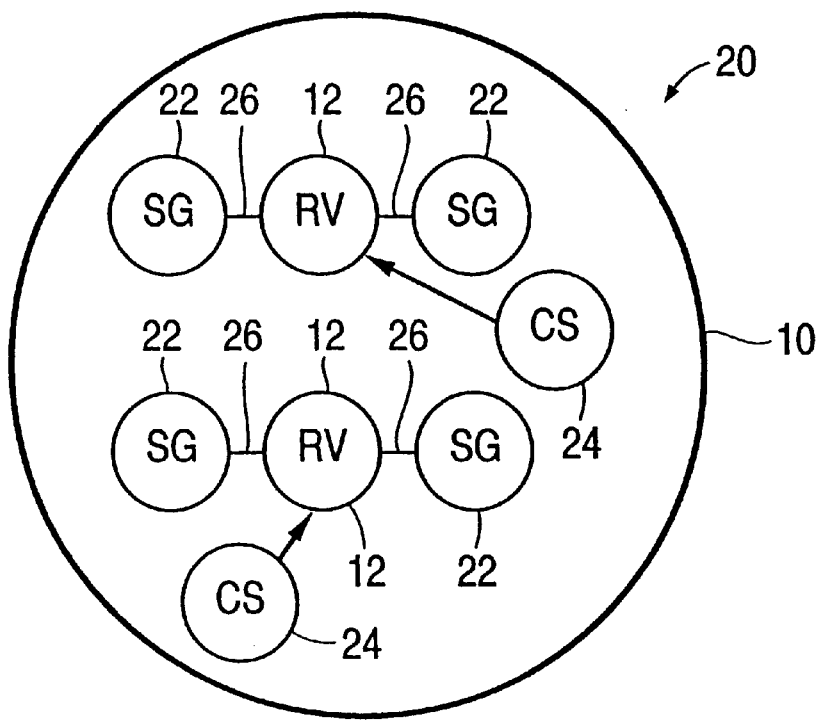
FIG. 3 is a schematic showing a first embodiment of the present invention, a single containment building including two reactor vessels having separate coolant systems and separate steam generators associated with each of the reactor vessels.

A first embodiment of the present invention, nuclear power plant 20, is illustrated in FIG. 3. Plant 20 includes containment building 10, two reactor vessels 12, a plurality of steam generators 22, and two control systems 24. In the illustrated embodiment, each of the reactor vessels 12 and resulting generated electrical power is controlled completely independently of the other reactor vessel. As a result, energy generated by each reactor vessel 12 is converted to electrical power using coolant or steam supply systems 26 associated only with that reactor vessel as well known in the art. However, the two nuclear reactors advantageously share a single containment building, reducing cost. Further, having two such reactors within a single structure makes further redundant control or safety systems more cost effectively shared between each of the reactors.

Figure 4:
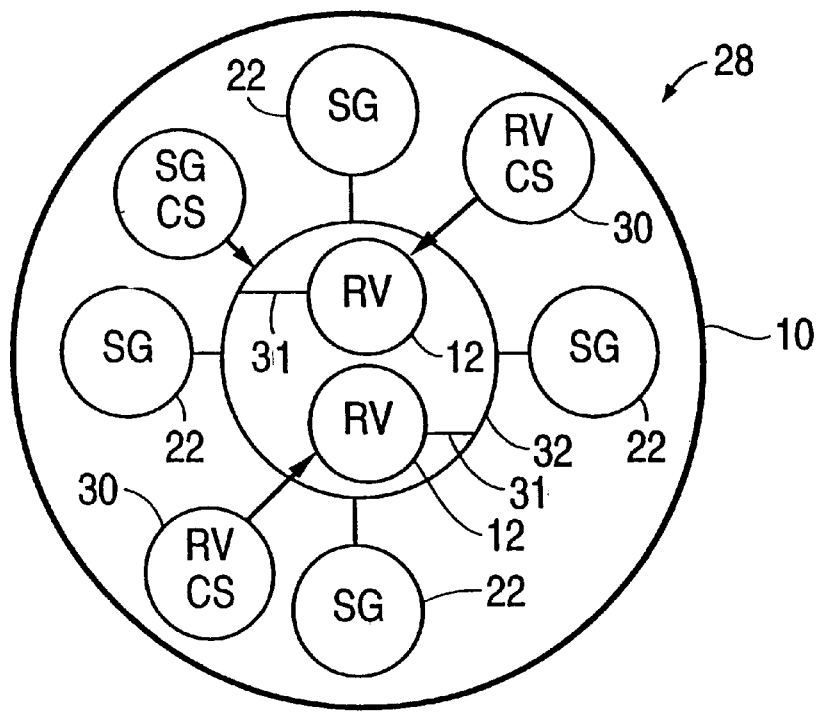
FIG. 4 is a schematic showing a second embodiment of the present invention, a single containment building including a plurality of reactor vessels, separate coolant systems, a common feedwater header associated with the separate cooling lines, and a plurality of steam generators associated with the common header.

A second embodiment of the present invention, nuclear power plant 28, is illustrated in FIG. 4. Plant 28 is an example of a partial joint control philosophy involving two or more reactor vessels 12 within a single containment building 10. Each of the reactor vessels 12 has its own reactor vessel control system 30 and its own coolant or steam supply system 31. However, the two reactor vessels share a common feedwater heat exchange system with header 32. A plurality of steam generators 22 are associated with header 32. A steam generator control system 25 may also be provided. As a result, power generated from either one of the reactor vessels may be used to supply steam to the same steam generator by means of the common header 32. Thus, power may be most efficiently generated using a combination of one or more of the reactor vessels.

Figure 5:
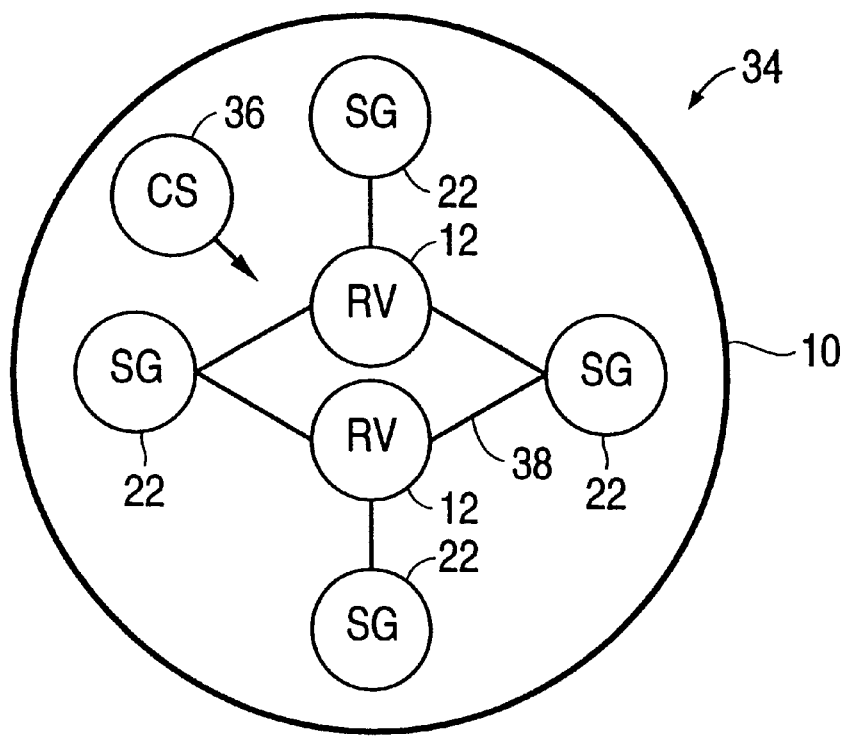
FIG. 5 is a schematic showing a third embodiment of the present invention, a single containment building including a plurality of reactor vessels, a common coolant system, and common steam generators shared between the reactor vessels.

FIG. 5 is an example of third embodiment of a nuclear power plant 34 having an integrated control philosophy. A single control system 36 is used to operate two reactor vessels 12 within a single containment building 10 sharing a common coolant system 38. Steam generators 22 are integrally connected to common coolant or steam supply system 38 to provide electrical energy. More precise control of the entire plant is possible while reducing the expense of having redundant primary systems performing the same function for only one reactor vessel at a time.

Figure 6:
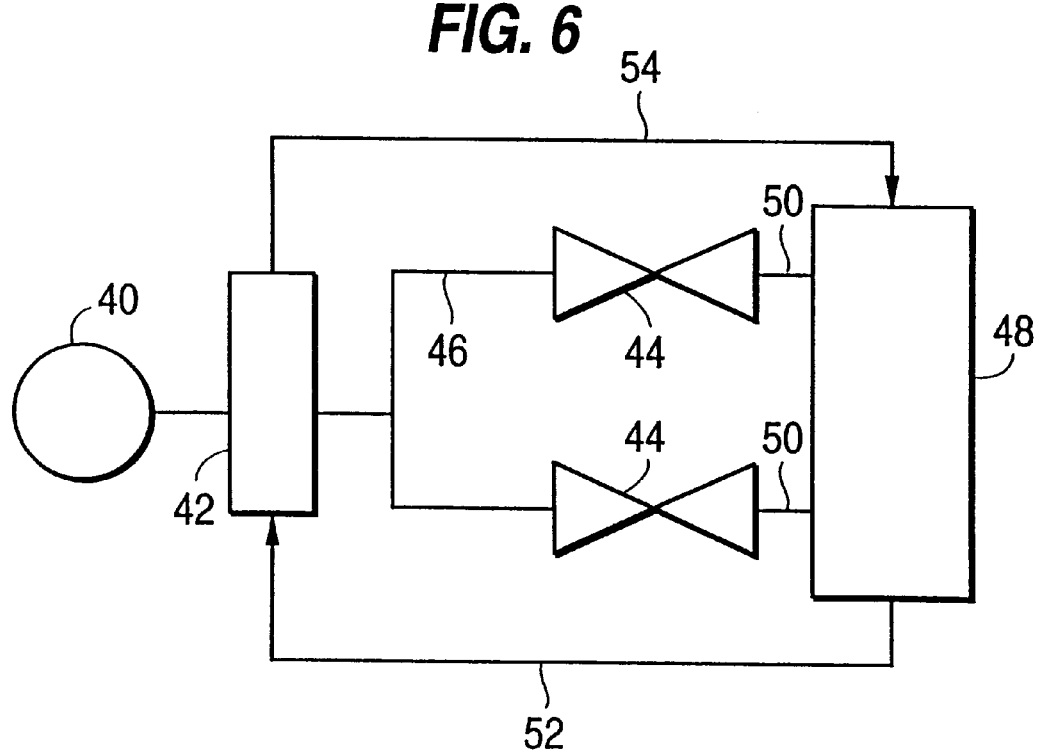
FIG. 6 is a schematic showing thermal energy generated by a plurality of reactor vessels converted to steam by a feedwater coolant system, split among a plurality of steam generator turbines that convert the thermal energy to electricity with the coolant then condensed and returned to the starting point as steam generator feedwater.

Finally, FIG. 6 is an example of how power may be generated using two steam generator turbines in parallel. Thermal power in the form of steam is generated at location 40 which then passes through heat exchanger 42 having a feedwater coolant system. The heat turns the water in the feedwater coolant system to steam which is then routed through turbines 44 by means of lines 46 where it is used to generate electricity. The remnant energy within the steam passes through condenser 48 by means of lines 50 with the feedwater returned back to heat exchanger 42 by means of line 52. If necessary, turbines 44 may be partially or completely bypassed using steam bypass line 54 which represents a reactor power cut back such that all or part of the thermal energy generated at location 40 is immediately released through condenser 48. Typically, a small amount of steam is extracted from turbines 44 or from lines 46 to pre-heat feedwater flowing through line 52.

Preferred embodiments of the present invention have been disclosed. A person of ordinary skill in the art will realize, however, that certain modifications and alternative forms will come within the teachings of this invention. Therefore, the following claims should be studied to determine the true scope and content of the invention.

We claim:

1. A single containment building for a nuclear reactor, comprising:

at least two reactor vessels each having an independent ability to generate thermal energy which is transferred away from said at least two reactor vessels by means of coolant contained within a coolant system, wherein said at least two reactor vessels have separate coolant systems, said thermal energy of said separate coolant systems transferred to a common header with at least one steam generator connected to said header such that there is independent control of each of said separate coolant systems and joint control of said header and said steam generator.

2. A single containment building as recited in claim 1, wherein there are a plurality of steam generators connected to said header.

3. A single containment building as recited in claim 2, wherein said containment building includes a spherical portion, a revised diameter of said spherical portion being less than 1.5 times an original diameter of a containment building having only one reactor vessel.

4. A single containment building as recited in claim 3, wherein said revised diameter is between 1.2 and 1.3 times that of said original diameter.

* * * * *